Jan. 13, 1953 W. CROOK 2,625,008
VARIABLE FLOW NOZZLE
Filed Feb. 28, 1951
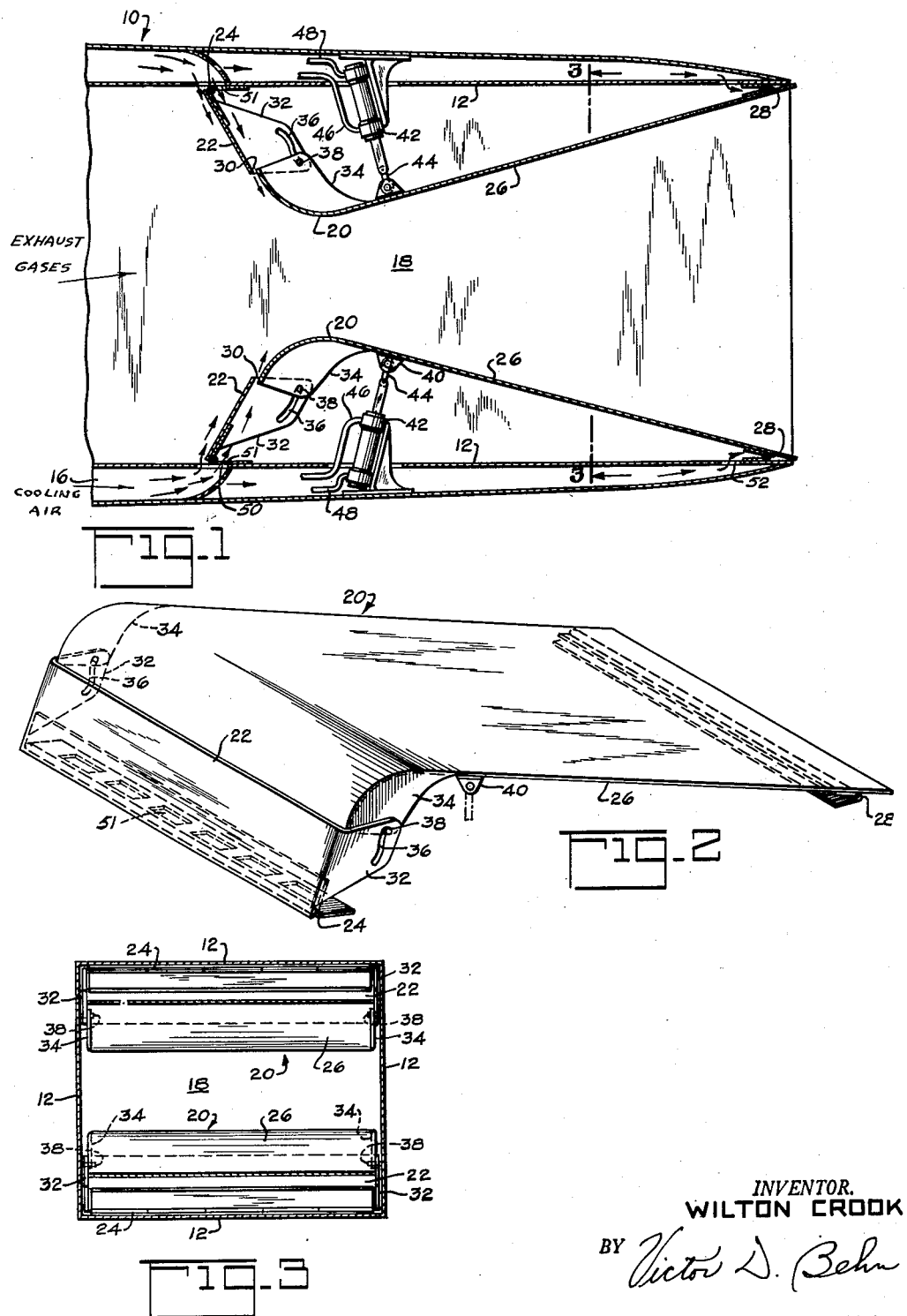
INVENTOR.
WILTON CROOK
BY Victor D. Behn
ATTORNEY Patented Jan. 13, 1953

2,625,008

UNITED STATES PATENT OFFICE 2,625,008

VARIABLE FLOW NOZZLE

Wilton Crook, Bloomfield, N. J., assignor to Curtiss-Wright Corporation, a corporation of Delaware Application February 28, 1951, Serial No. 213,102

7 Claims. (Cl. 60—35.6)

This invention relates to jet engines and is particularly directed to a variable nozzle construction for such engines.

The invention has been designed for use with an engine having a duct through which a fluid discharges for providing at least a portion of the forward propulsive thrust of the engine. As is well known, the efficiency and propulsive thrust obtained from such an engine may be controlled by providing an adjustable nozzle at the discharge end of said duct. The provision of such an adjustable nozzle is particularly important for efficient operation of jet propulsive combustion engines of aircraft. Because of the high temperature and velocity of the exhaust gases of such jet engine the provision of a satisfactory variable exhaust nozzle therefor presents a difficult problem. An object of the invention comprises the provision of a novel and simple variable nozzle construction for a jet engine in which the bearings for the movable nozzle parts can readily be cooled and the nozzle provides a substantially streamlined flow path for the exhaust gases in all of its positions of nozzle adjustment.

Other objects of the invention will become apparent upon reading the annexed detailed description in connection with the drawing in which:

Fig. 1 is an axial sectional view through a nozzle embodying the invention;

Fig. 2 is a perspective view of one of the movable nozzle sides; and

Fig. 3 is a sectional view to a reduced scale and taken along line 3—3 of Fig. 1.

Referring to the drawing, reference numeral 10 designates a portion of the exhaust duct of an engine, the engine exhaust gases discharging through said duct into the surrounding atmosphere to provide said engine with forward propulsive thrust. Such a duct generally has a circular cross-section. In accordance with the present invention, at least the discharge end of said duct is provided with an inner wall having a rectangular cross-section at said discharge end formed by flat sides 12.

As illustrated the duct 10 has a double wall construction thereby forming an annular passage 16 about its inner wall. A nozzle 18 of variable but rectangular cross-sectional area is formed at the discharge end of the duct 10. The rectangular nozzle 18 comprises a pair of movable sides 20 extending between a pair of fixed parallel sides 12 of the inner wall of the duct 10 whereby said movable and fixed parallel sides form the four walls of said rectangular nozzle 18. Each of the movable nozzle sides 20 is arched toward the other of said movable sides to provide the nozzle within a minimum cross-sectional area intermediate its ends. As illustrated, the combined profile of the two movable sides 20 in the axial section of Fig. 1 is similar to the profile of a Venturi tube in that the minimum cross-sectional area of said nozzle is closer to the upstream end of said nozzle. Each movable nozzle side 20 comprises an upstream segment 22 pivotally connected at its upstream end by a hinge 24 to the adjacent wall 12 of the duct 10 and a downstream segment 26 pivotally connected at its downstream end by a hinge 28 to said wall, the axes of said hinges being disposed transverse to the axis of the duct 10. The upstream nozzle segment 22 of each movable nozzle side 20 terminates short of the minimum cross-sectional area of the nozzle and overlaps the adjacent end of the downstream nozzle segment 26 of said movable nozzle side to form a gap or passage 30 between each pair of said segments. Each upstream nozzle segment 22 has a pair of side flanges 32 overlapping corresponding side flanges 34 of its associated downstream nozzle segment 26. In addition each said side flange 32 of an upstream nozzle segment 22 has an elongate groove or slot 36 and a pin 38 on the adjacent side flange 34 of the associated downstream nozzle segment 26 extends into said groove. Each groove 36 and associated pin 38 comprise a cam and cam follower combination interconnecting their associated upstream and downstream nozzle segments 22 and 26.

Each downstream nozzle segment 26 is provided with a pair of ears 40 disposed at its opposite side edges and to each of said ears a piston rod of a hydraulic motor 42 is pivotally connected by means of an interposed link 44. Upon the application of fluid pressure to one end of the motors 42 through the lines 46 and upon relief of pressure at the other end of said motors through the lines 48, the downstream nozzle segments 26 are moved away from each other to increase the area of the minimum area portion of the nozzle 18. Upon reversal of said pressure application and relief, the downstream nozzle segments 26 are moved toward each other to decrease the area of said minimum area portion of the nozzle. As illustrated in the drawing, the downstream nozzle segments 26 have been moved toward each other to the limit of their travel as permitted by the grooves 36 and pins 38. The grooves 36 are contoured so that said grooves and their associated pins 38 maintain a close fit between the overlapping portions of their associated movable nozzle segments 22 and 26 so that in all positions of adjustment of the nozzle the downstream section 26 forms a substantially smooth continuation of the upstream section 22 with but a small gap or passage 30 therebetween.

With the nozzle construction described, the minimum cross-sectional area of the nozzle 18 can readily be varied and in all positions of nozzle adjustment the nozzle provides a substantially continuous and streamlined flow path for the discharging gases. The only interruption in the smooth surface presented by each movable nozzle side 20 is the slight irregularity at the gap or passage 30 between the overlapping portions of the associated upstream and downstream nozzle segments 22 and 26. Furthermore this gap or passage 30 is upstream of the minimum area of the nozzle where any irregularity in the nozzle surface causes but relatively little reduction in nozzle efficiency as compared to the reduction which would be caused by a similar irregularity downstream of said minimum area.

The aforedescribed variable nozzle construction permits the hinges pivotally supporting the movable nozzle segments 22 and 26 to be readily cooled by cooling air supplied through the annular passage 16. Thus this cooling air can be directed over the hinges 24 through openings 50 in the adjacent portion of the inner wall of the duct 10 and openings 51 in the hinge side plate secured to said inner wall and at the same time this air flows over the inner and outer surfaces of the upstream nozzle segments 22 to help cool said segments thereby protecting said segments against the high temperature of the combustion gases discharging through said duct. The cooling air flowing over the upstream nozzle segments will also flow over the upstream portion of the downstream nozzle segments to help protect said segments against the destructive heat of the combustion gases. For example some of the air flowing over the surface of an upstream nozzle segment 22 unexposed to the combustion gases will flow out through the gap or passage 30 between said upstream nozzle segment and the adjacent downstream segment 26 and then over the outer surface of said downstream segment exposed to said combustion gases. In addition cooling air can be directed over the hinges 28 at the downstream end of the nozzle through openings 52 in the adjacent portion of the inner wall 12 of the duct 10.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A variable discharge nozzle for an engine having an exhaust duct through which gases discharge for providing said engine with forward propulsive thrust, said nozzle having a rectangular cross-section and comprising a pair of substantially-parallel opposed fixed sides and a pair of opposed movable sides, each of said movable sides being arched toward the other of said movable sides so as to provide the nozzle with a minimum area intermediate its ends, each of said movable sides comprising an upstream nozzle segment and a downstream nozzle segment with said segments overlapping each other; means pivotally connecting the upstream end of each said upstream nozzle segment to said duct; means pivotally connecting the downstream end of each said downstream nozzle segment to said duct, the axis of each said pivotal connection being disposed transverse to the axis of said duct; means connecting together the adjacent ends of the upstream and downstream nozzle segments of each said movable side; each said connecting means including a pin on one nozzle segment extending into a slot in the adjacent nozzle segment with said pin being disposed parallel to the pivot axis of its nozzle segment and with said slot being elongated in a direction transverse to said pin for movement of said pin therealong in response to pivotal movement of said nozzle segments so as to maintain the overlapping portions of said segments in close relationship in all positions of adjustment of said segments about their respective pivot axes; and means for moving said nozzle segments about their respective pivot axes to vary the minimum area of said nozzle.

2. A variable discharge nozzle for an engine having an exhaust duct through which gases discharge for providing said engine with forward propulsive thrust, said nozzle having a rectangular cross-section and comprising a pair of substantially-parallel opposed fixed sides and a pair of opposed movable sides, each of said movable sides being arched toward the other of said movable sides so as to provide the nozzle with a minimum area intermediate its ends, each of said movable sides comprising an upstream nozzle segment and a downstream nozzle segment; means pivotally connecting the upstream end of each said upstream nozzle segment to said duct; means pivotally connecting the downstream end of each said downstream nozzle segment to said duct, the axis of each said pivotal connection disposed transverse to the axis of said duct; and means for moving said nozzle segments about their respective pivot axes to vary the minimum area of said nozzle, the adjacent ends of the two segments of each movable nozzle side overlapping each other to provide said nozzle side with a substantially continuous surface in all positions of adjustment of said nozzle segments.

3. A variable discharge nozzle for an engine having an exhaust duct through which gases discharge for providing said engine with forward propulsive thrust, said nozzle having a rectangular cross-section and comprising a pair of substantially-parallel opposed fixed sides and a pair of opposed movable sides, each of said movable sides being arched toward the other of said movable sides so as to provide the nozzle with a minimum area intermediate its ends, each of said movable sides comprising an upstream segment and a downstream segment with said segments overlapping each other; means pivotally connecting the upstream end of each said upstream nozzle segment to said duct; means pivotally connecting the downstream end of each said downstream nozzle segment to said duct, the axis of each said pivotal connection being disposed transverse to the axis of said duct; means interconnecting the two nozzle segments of each movable nozzle side to provide said nozzle side with a substantially continuous surface in all positions of adjustment of said nozzle segments about their respective pivot axes; and means for moving said nozzle segments about their respective pivot axes for varying the minimum area of said nozzle.

4. A variable discharge nozzle for an engine having an exhaust duct through which gases discharge for providing said engine with forward propulsive thrust, said nozzle having a rectangular cross-section and comprising a pair of substantially-parallel opposed fixed sides and a pair of opposed movable sides, each of said movable sides being arched toward the other of said movable sides so as to provide said nozzle with a minimum cross-sectional area intermediate its ends, each of said movable sides comprising an upstream segment and a downstream segment with said upstream segment overlapping said downstream segment at a point upstream of said minimum area section; means pivotally connecting the downstream end of each downstream nozzle segment to said duct; means pivotally connecting the upstream end of each upstream nozzle segment to said duct, the axis of each said pivotal connection being disposed transverse to the axis of said duct; and means for moving said nozzle segments about their respective pivot axes so as to vary the minimum area of said nozzle.

5. A variable discharge nozzle as recited in claim 4 and including means for supplying a cooling medium for flow in a downstream direction over the inner and outer surfaces of said upstream nozzle segments.

6. A variable discharge nozzle for an engine having an exhaust duct through which gases discharge for providing said engine with forward propulsive thrust, said nozzle having a rectangular cross-section and comprising a pair of substantially-parallel opposed fixed sides and a pair of opposed movable sides, each of said movable sides being arched toward the other of said movable sides so as to provide said nozzle with a minimum cross-sectional area intermediate its ends, each of said movable sides comprising an upstream segment and a downstream segment with said upstream segment overlapping said downstream segment at a point upstream of said minimum area section; means pivotally connecting the downstream end of each downstream nozzle segment to said duct; means pivotally connecting the upstream end of each upstream nozzle segment to said duct, the axis of each said pivotal connection being disposed transverse to the axis of said duct; means interconnecting the two nozzle segments of each movable nozzle side for maintaining the overlapping portions of said segments in close relationship to provide a substantially continuous nozzle surface in all positions of adjustment of said segments about their respective pivot axes; and means for moving said nozzle segments about their respective pivot axes for varying the minimum area of said nozzle.

7. A variable discharge nozzle for an engine having an exhaust duct through which gases discharge for providing said engine with forward propulsive thrust, said nozzle having a rectangular cross-section and comprising a pair of substantially-parallel opposed fixed sides and a pair of opposed movable sides, each of said movable sides being arched toward the other of said movable sides so as to provide said nozzle with a minimum cross-sectional area intermediate its ends, each of said movable sides comprising an upstream segment and a downstream segment with said upstream segment overlapping said downstream segment at a point upstream of said minimum area section; means pivotally connecting the downstream end of each downstream nozzle segment to said duct; means pivotally connecting the upstream end of each upstream nozzle segment to said duct, the axis of each said pivotal connection being disposed transverse to the axis of said duct; means interconnecting the overlapping portions of the two nozzle segments of each movable nozzle side, said interconnecting means comprising a pin on one of said overlapping portions extending into a groove on the other of said portions for maintaining said overlapping portions in close relationship to provide a substantially continuous nozzle surface in all positions of adjustment of said segments about their respective axes; and means for moving said nozzle segments about their respective pivot axes for varying the minimum area of said nozzle.

WILTON CROOK.

REFERENCES CITED

The following references are of record in the file of this patent:

UNITED STATES PATENTS

| Number | Name | Date |
|---|---|---|
| 2,457,936 | Stalker | Jan. 4, 1949 |
| 2,488,174 | Clegern | Nov. 15, 1949 |

FOREIGN PATENTS

| Number | Country | Date |
|---|---|---|
| 572,724 | Great Britain | Oct. 22, 1945 |